R. G. O'NEAL, J. V. HAMMETT & L. GUINN.
AUTO PULL-OUT.
APPLICATION FILED DEC. 1, 1917.

1,284,434.

Patented Nov. 12, 1918.
2 SHEETS—SHEET 1.

Inventors
Richard G. O'Neal
James V. Hammett and Lewis Guinn,
By
Attorney

R. G. O'NEAL, J. V. HAMMETT & L. GUINN.
AUTO PULL-OUT.
APPLICATION FILED DEC. 1, 1917.

1,284,434.

Patented Nov. 12, 1918.
2 SHEETS—SHEET 2.

Inventors
Richard G. O'Neal
James V Hammett and Lewis Guinn,
By
C. Hume Talbert
Attorney

UNITED STATES PATENT OFFICE.

RICHARD G. O'NEAL, JAMES V. HAMMETT, AND LEWIS GUINN, OF EUFAULA, OKLAHOMA.

AUTO PULL-OUT.

1,284,434.    Specification of Letters Patent.    Patented Nov. 12, 1918.

Application filed December 1, 1917. Serial No. 204,950.

*To all whom it may concern:*

Be it known that we, RICHARD G. O'NEAL, JAMES V. HAMMETT, and LEWIS GUINN, citizens of the United States, residing at Eufaula, in the county of McIntosh and State of Oklahoma, have invented new and useful Improvements in Auto Pull-Outs, of which the following is a specification.

The invention relates to an improved attachment for auto vehicles, being particularly a device to be utilized for drawing such vehicles out of muddy or sandy places and to assist in drawing them up steep inclines.

It is the principal purpose of the invention to provide a device of this character which may be readily attached to an automobile without requiring modification of such vehicle. The device can be constructed in various shapes to adapt it for attachment to various makes of vehicles.

It is the further purpose of the invention to provide a pull-out in which the speed of the mechanism effecting the pull-out operation may be varied.

A still further purpose is to provide means within the reach of the operator of an auto vehicle whereby he may have complete control of the pull-out mechanism.

As a still further purpose it is the intention to provide a device of this character which will be simple in construction, effective in operation, strong and durable in structure and inexpensive to manufacture.

Other and further purposes will be made apparent as the invention is described in detail.

To the exact construction herein shown and described, the invention is not to be restricted. The actual reduction to practice may suggest certain desirable changes or alterations and the right is claimed to make any which do not deviate from the scope of the subjoined claim.

In the accompanying drawings:

Figure 1 is a top plan view showing the invention applied to a well known make of automobile.

Fig. 2 is a side elevation of the structure shown in Fig. 1.

Figure 3:
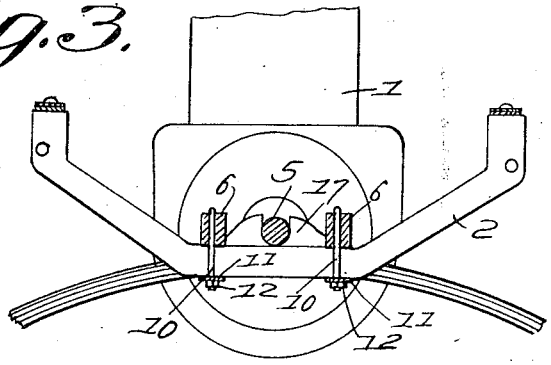
Fig. 3 is a section on the line 3—3 of Fig. 1.
Figure 4:
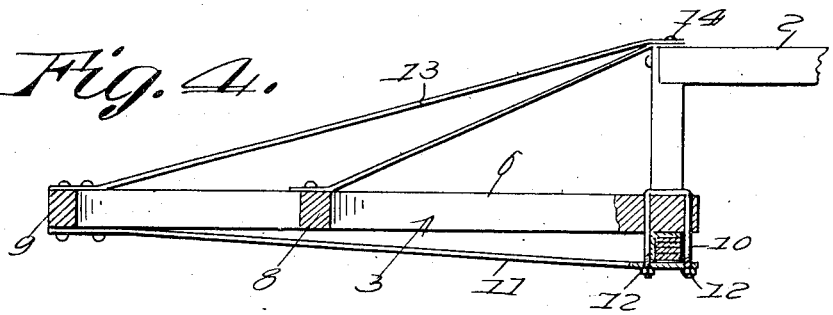
Fig. 4 is a section on the line 4—4 of Fig. 1.
Figure 5:
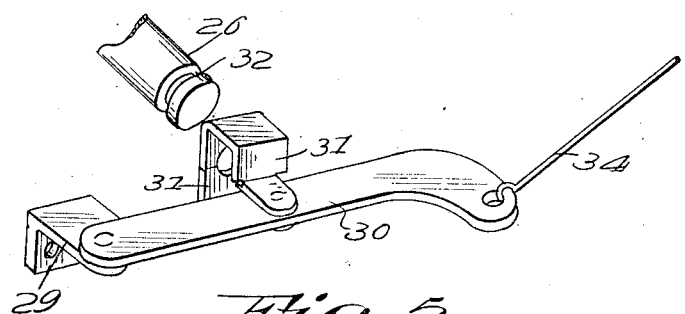
Fig. 5 is a detail perspective view of the shifter lever and its attendant portion of the pull-out shaft.

Referring to the drawings, there is shown the front portion of a well known make of automobile having an engine 1 and frame 2.

The improved pull-out as a whole comprises a frame 3, a drum 4 and a shaft 5.

The frame 3 is composed of two longitudinal members 6, a shorter longitudinal member 7, a long transverse member 8 and a short transverse member 9. These several members referred to are combined into a unitary structure of the shape shown in Figs. 1 and 2 and are made preferably of cast metal, but these members may be made of rolled metal and assembled in any satisfactory member. The frame 3 is attached to the frame 2 of the vehicle by appropriate U-bolts 10 which pass through the free ends of the longitudinal members 6 after they have been positioned on the frame 2 in such a way as to make the cranking shaft bearing centrally disposed between them. Braces 11 extend from the forward ends of the longitudinal members 6 and lie against the under portion of the frame 2 to which these longitudinal members are attached, the U-bolts 10 before referred to, passing through these braces and receiving on their threaded ends appropriate nuts 12. A brace 13 connecting with one of the longitudinal members 5 near its front end extends back to the frame 2 and is appropriately connected thereto on one side of this longitudinal member by an appropriate bolt 14. In the same way the short longitudinal member 7 is attached to the frame 2 by an appropriate bolt 15. Thus the frame 3 is securely attached on the front of the frame 2 of the auto vehicle.

The shaft 5 is connected with the shaft of the engine 1 by a coupling 16 and this shaft passes through the bearing 17 ordinarily employed to hold the starting crank and then through a bearing formed in the long transverse member 8. The position of the frame 3 on the frame 2 is such as to bring the shaft 5 centrally between the two longitudinal members 6 and this shaft has attached to it a friction wheel 18 which is secured against angular movement on the shaft by the feather 19, the friction wheel 18 carries a circumferential binding 20 made of some suitable frictional material and the wheel is further provided with a set-screw 21 which passes through its hub and bears upon the shaft 5. The object of this arrangement is to permit the friction wheel to be moved along the shaft 5 when desired but the friction wheel is precluded from angular movement by the feather as aforesaid. The set-screw 21 is, of course, intended to be set tight against the shaft 5 except when it is desired to shift the friction wheel 18 along the shaft.

The shaft 5 terminates between the tranverse members 8 and 9 where it receives a conventional coupling member 22.

The starting crank 23 is journaled in the transverse member 9 in such a way as to be in direct alinement with the shaft 5 and this starting crank carries a clutch member 24 designed to engage the clutch member 22. The conventional spring 25 is provided in surrounding relation to the starting crank, being compressed between the right angled portion of the crank and the front face of the transverse member 9 and tending to keep the clutch members 22 and 24 normally apart and the starting crank and the shaft 5 disconnected in the usual way.

Supported between the longitudinal member 7 and the adjacent longitudinal member 6, there is a shaft 26 which is journaled in both these members and which projects from opposite sides of each. Between the two members just referred to, this shaft carries a drum 27 which is affixed to it in any suitable manner. That end of the shaft 26 which projects through the longitudinal member 6 carries a disk 28 which is fixedly secured to it in any acceptable manner. The face of this disk is frictionally engaged by the periphery of the friction wheel 18 before referred to which friction wheel is designed to turn the disk and the shaft and drum with which the disk is connected. The shaft 26 is so mounted as to be capable of slight longitudinal movement in its bearings in the members 6 and 7 and the drum 27 is of such a length as to permit of this longitudinal movement, the object of this longitudinal movement being to shift the disk 28 toward or away from the friction wheel 18.

On the outside of the longitudinal member 7 there is attached in any suitable way an arm 29 at whose end a shifter lever 30 is pivoted. This shifter lever has attached to it on either side a member 31 these two members 31 coöperating to loosely engage that end of the shaft 26 which projects from the side of the longitudinal member 7. This end of the shaft 26 is provided with a circumferential slot 32, the two members 31 just referred to straddling the end of the shaft and engaging in this slot.

A spring 33 attached between the side of the member 7 and the shifter lever 30 tends normally to force the two members 31 away from the members 7, thus tending normally to keep the disk 28 out of engagement with the friction wheel 18.

The shifter lever 30 is arcuate in plan, this construction placing its free end in a plane substantially at right angles to the plane in which the other end and the members 31 lie. This free end has attached to it a rope or cable 34 which is designed to be carried on the driver's seat in the vehicle, so that the driver may operate the shifter lever 30 to engage or disengage the disk 28 from the friction wheel 18.

The drum 27 carries a cable 35 one end of which is fixedly attached to the drum, the other end being left free for attachment to a tree stump, post or some other object rigidly attached to the ground.

In the operation of the device, the cable 35 is attached to some immovable object in case the vehicle to which the device is attached is stalled. Assuming the stalling of the vehicle to have stopped the engine, it is started by effecting the engagement of the clutch members 22 and 24 and turning the crank 23. This starts the engine in the customary way. The driver of the vehicle may then takes his seat and by means of the rope 34 operate the shifter lever 30 so as to effect frictional engagement between the disk 28 and the friction wheel 18. The engine 1 being in motion, the friction wheel 18 is rotated in consequence and when the disk 28 is brought into contact with it, rotary movement is imparted to the drum 27 which begins to wind the cable 35 causing it to draw the vehicle out of the place in which the vehicle was stalled.

This particular arrangement is advantageous in that it permits the driver of the vehicle to quickly effect or release connection between the driving and driven part of the device which is always of great advantage to avoid overtaxing the engine.

Another feature of this particular arrangement is that the friction wheel 18 can be adjusted in position along the shaft 5 so that it may contact with the disk 28 either near the center of the latter or near the periphery thereof or of the points in between, thereby permitting a change of speed for the drum without variation in the speed of the engine.

The invention having been described, what is claimed as new and useful is:

In a pull-out for auto vehicles, a frame designed for attachment to the frame of an auto vehicle, a shaft journaled in said frame and coupled to the vehicle engine shaft, a second shaft journaled in said frame, a drum mounted on said second shaft, a cable carried by the drum and designed for attachment to an immovable object, a disk carried by one end of the second shaft, a friction wheel carried by the first said shaft and adapted for engagement with the disk, a spring controlled lever carried by the frame and having connection with the other end of said second shaft, and a cable attached to said lever, whereby the disk and friction wheel may be engaged or disengaged, the said second shaft being designed for a slight longitudinal movement.

In testimony whereof we affix our signatures.

RICHARD G. O'NEAL.
JAMES V. HAMMETT.
LEWIS GUINN.

Copies of this patent may be obtained for five cents each, by addressing the "Commissioner of Patents, Washington, D. C."